Oct. 13, 1970 G. T. PRUITT ET AL 3,533,952
TRANSMISSION OF MECHANICAL POWER
Filed Aug. 11, 1965
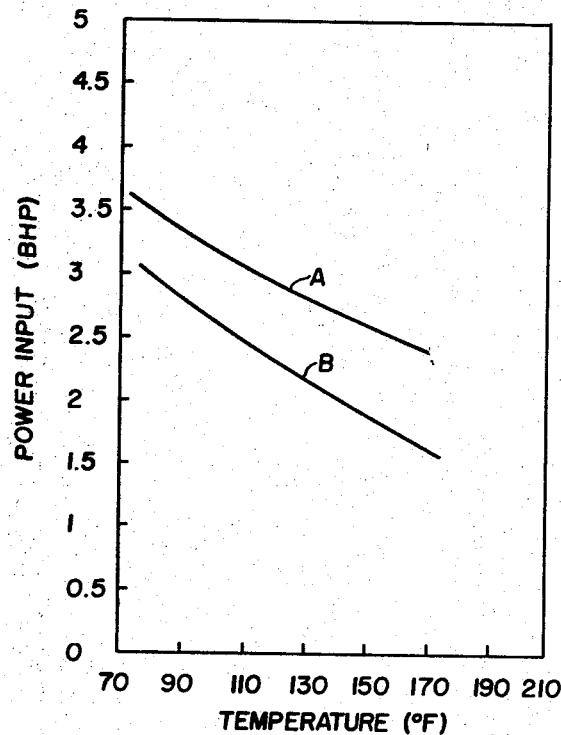
FIG. 3
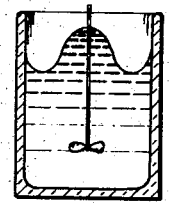
FIG. 1A
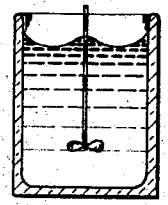
FIG. 1B
FIG. 1C
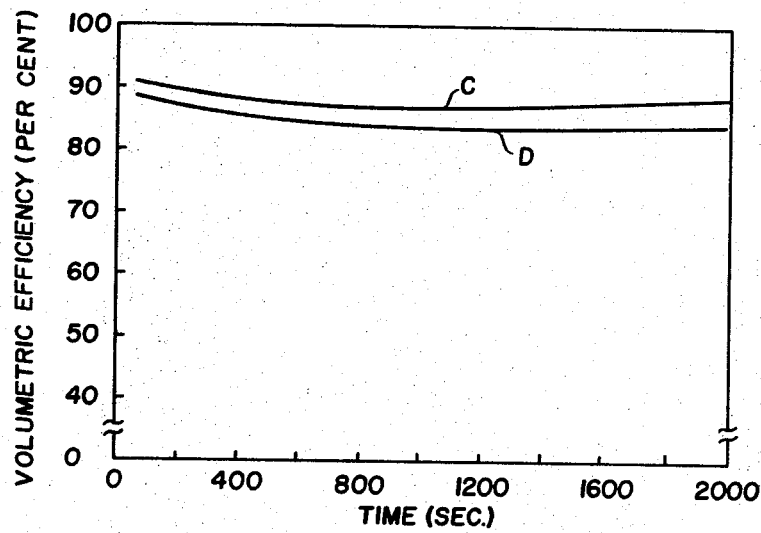
FIG. 4
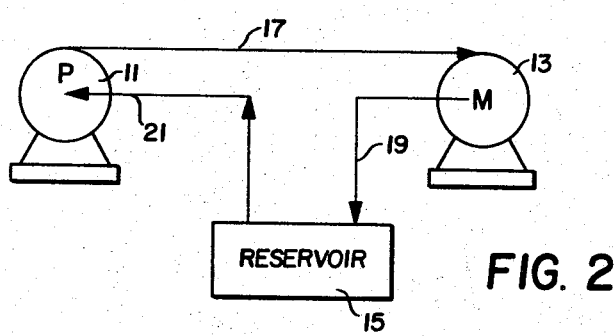
FIG. 2
GAIL T. PRUITT
WILLIAM E. BROWN
HORACE R. CRAWFORD
INVENTORS
BY
ATTORNEY

United States Patent Office 3,533,952
Patented Oct. 13, 1970

3,533,952
TRANSMISSION OF MECHANICAL POWER
Gail T. Pruitt, Dallas, and William E. Brown and Horace R. Crawford, Richardson, Tex., assignors to The Western Company of North America, Fort Worth, Tex., a corporation of Delaware
Filed Aug. 11, 1965, Ser. No. 483,003
Int. Cl. C09k 3/02
U.S. Cl. 252—76  6 Claims

ABSTRACT OF THE DISCLOSURE

A method of transmitting mechanical power in which a visco-elastic liquid is used as the transmission fluid in a hydraulic system. The major proportion of the liquid is a hydrocarbon oil conventionally used as a hydraulic fluid, and a minor proportion is an additive selected from the group consisting of alkali metal salts of higher fatty acids. The alkali metal salts of fatty acids can be present in quantities from about 0.1% to about 20.0% by weight of the total visco-elastic liquid.

---

This invention relates to the transmission of mechanical power, and more specifically by utilizing a liquid to transmit power from a driving member to a driven member.

Power transmission systems involving hydraulic fluid are well-known in the art. Included in such systems is the hydrostatic type in which a driving member imparts motion to a fluid to transfer it to a remote movable element, i.e., a motor which is powered by the moving fluid. Also included within the type of system is a single housed unit involving a rotatable driving member and rotatable driven member, both immersed in a fluid which serves as a transfer medium for transferring power from the driving to driven member. The latter type is exemplified by many existing fluid transmissions, for example, in automobiles, trucks, and other vehicles.

Considerable power loss and fluid heating is experienced in the operation of conventional fluid transmission systems. The hydrostatic type is particularly noted to exhibit power loss since the driving member and driven member are rather remotely situated and a "pumped" fluid must move through conduits of substantial length in order to operate the system. Hydrostatic transmission losses may be decreased considerably by minimizing separation between the driving member and driven member, but then the advantages in transferring power over a substantial distance by the simple expedient of conduit interconnection are lost.

A primary object of the present invention is to increase the power transmission efficiencies of fluid transmission systems. Such object applies to the hydrostatic type, as well as to the direct coupling type. In the case of the hydrostatic type, it is an object to so increase efficiencies that the hydrostatic type system is practical and competitive with, if not superior to, standard mechanical power transmission systems for transfer of power over a substantial distance. A further object is to provide a hydraulic working liquid which may be utilized in both hydrostatic and direct coupling transmission systems to provide high efficiency power transfer in a simple and economical manner.

In accordance with the present invention, it has been found that a visco-elastic liquid may be used as the working fluid in a fluid power transmission system to provide increased efficiency of power transmission. It has been further found that a satisfactory visco-elastic fluid may be obtained by mixing together a major proportion of a conventional hydraulic fluid and a minor proportion of an additive selected from the group consisting of organic polymers soluble in the conventional hydraulic fluid and alkali metal salts of fatty acids. The visco-elastic liquid may serve as a coupling between a driving and driven member within a single housing or it may be transferred by means of conduits from the driving member, to actuate the driven member, and then returned to the driving member for repetition of the flow pattern.

Preferably, the organic polymer is present in quantity ranging from about 0.005% to about 5.0%. In turn, the hydraulic fluid is preferably present in complementary proportions, ranging from about 99.995% to about 95.0%. The recited percentages are based on the total weight of hydraulic fluid and additive. In many cases a minor amount of conventional additive (antioxidant, etc.) may be used.

Preferred oil soluble organic polymers include polystyrene and polybutenes, e.g., polyisobutylene.

In another embodiment, the additive utilized with an oil base hydraulic fluid is the alkali metal salt of a fatty acid, preferably an oil insoluble salt. Preferred alkali metal salts include the oil insoluble sodium and potassium salts of fatty acids. Best results are achieved with concentrations of between about 0.1% and 20.0% of such additive. It should be noted that in practice, the salt may be formed in situ by reacting a strong aqueous solution of alkali metal hydroxide with a fatty acid while both components are dispersed in a major proportion of a conventional hydraulic fluid, e.g., a liquid hydrocarbon. By virtue of such processing, a small quantity of water is introduced into the system. Surprisingly, the presence of such small quantity of water appears helpful instead of harmful, provided that an excess of water is avoided.

In connection with the embodiment involving an alkali metal salt of a fatty acid, it is found that ethoxylated dehydroabietylamine extends and/or activates the salt.

For a more complete understanding of the present invention and for further objects and advantages thereof, reference may now be had to the following description taken in conjunction with the accompanying drawings in which:

FIG. 1 is a schematic diagram illustrating the difference between an ordinary liquid and a visco-elastic liquid, the figure consisting of FIG. 1A, illustrating behavior of an ordinary liquid being stirred in a beaker with a conventional rotary stirrer, FIG. 1B illustrating behavior of a highly visco-elastic liquid being stirred under the same conditions, and FIG. 1C illustrating behavior of a less visco-elastic fluid being stirred under the same conditions;

FIG. 2 is a schematic diagram of a hydrostatic transmission;

FIG. 3 gives comparative curves of power input versus liquid temperature for performance of conventional hydraulic fluid and a fluid in accordance with the present invention; and FIG. 4 illustrates comparative curves of volumetric efficiency versus time for pumping system operation of conventional hydraulic fluid and a fluid in accordance with the present invention.

Referring now to FIG. 1, which consists of FIGS. 1A, 1B, and 1C, the behavior of three liquids being stirred with a conventional rotating stirrer is illustrated. Note that the fluid in FIG. 1B, in contrast to FIG. 1A, climbs the stirring rod. In FIG. 1C, the tendency to climb the stirring rod is also manifest, but not to nearly so great a degree as in the case of the fluid of FIG. 1B. The FIG. 1A fluid is of the ordinary type, while the fluids involved in FIGS. 1B and 1C are both visco-elastic, the former to a greater degree.

While a visco-elastic liquid may be distinguished by other characteristics, the rotating spindle or stirrer characteristics provide a satisfactory criteria. In some cases, special equipment may be necessary to observe the tendency to climb the stirrer, particularly in the case of fluids which are visco-elastic, but not to a marked degree.

Referring now to FIG. 2, conventional pump 11, conventional fluid motor 13, and a reservoir 15 are interconnected by suitable conduits. These conduits include the conduit 17 which conveys fluid discharge from the impeller of conventional fluid pump 11 to the intake of fluid motor 13; the discharge conduit 19 for conveying fluid to the reservoir 15; and the conduit 21 interconnecting the intake of pump 11 with the reservoir 15. The components and system of FIG. 1 are in all respects conventional, the figure being merely a schematic representation of a hydrostatic transmission system by which power is transferred from the pump 11 to the fluid motor 13. The present invention consists of utilizing a special liquid within a fluid transmission, and is not in any way limited to the type illustrated in FIG. 1, although that type will serve as exemplary of a system which benefits greatly in increased efficiency by application of the present invention.

The following specific examples are offered by way of illustration of the practice of the present invention and are not to be taken as in any way limiting its scope.

EXAMPLE 1

Referring to FIG. 3, the performance of a standard hydraulic fluid is compared to performance of a fluid with additive, in accordance with the present invention. The standard fluid consists of a conventional liquid hydrocarbon hydraulic oil, e.g., MIL–H5606A. Its performance within a closed system in which it was circulated by means of a pump is indicated by the curve A of FIG. 3, taken at the constant flow rate of 25.5 gallons per minute of fluid moved through the system. The power input is measured at different temperatures at this fixed flow rate. The curve B illustrates power input in the same system, with a flow rate of 26.5 gallons per minute constantly maintained, but utilizing a fluid in accordance with the present invention. The system operation associated with curve B utilizes the same hydraulic fluid as in comparative system operation in accordance with curve A, but with approximately 1.3% by weight of a fatty acid, e.g., Crofatol P and 0.8% by weight of a 50% sodium hydroxide-water solution thoroughly mixed with such conventional hydraulic fluid. From a comparison of the curves A and B, FIG. 3, it is seen that substantially less power input is required to produce the same flow rate within the system at a given temperature when the system includes the additive (curve B).

The material sold under the trademark Crofatol P is a mixture of fatty acids containing about 8.0% saturated fatty acids, 16.0% oleic acid, 16.0% isoleic acid, and 60% linoleic acid.

EXAMPLE 2

Referring now to FIG. 4, the standard hydraulic fluid of the preceding example is again compared to the same fluid modified in the same manner as that of the preceding example. At constant flow rates volumetric efficiency was plotted against time in a closed system through which the conventional fluid and modified fluid are pumped. The conventional fluid was maintained at a constant flow rate of 25.5 gallons per minute, while the conventional fluid modified by additive was maintained under somewhat higher constant flow rate, i.e., 26.5 gallons per minute, The volumetric efficiency of the modified fluid, as illustrated by curve C of FIG. 4, is seen to be higher at any given point of time than the volumetric efficiency of the conventional fluid, as indicated by the curve D of FIG. 4.

EXAMPLE 3

Fluid modified in accordance with the two preceding examples (i.e., the fluid involved in curve B of FIG. 3 and curve C of FIG. 4) is utilized as the working fluid in a transmission system of the type depicted in FIG. 2. It is found the power transmission efficiency is substantially higher than when conventional fluid is used. It is found that the equilibrium operating temperature of the temperature of the working fluid is about 10° F. less when the modified fluid is utilized.

EXAMPLE 4

Polyisobutylene with a molecular weight of about 200,000 is dissolved in MIL–H5606A, in quantity of 0.2% by weight of the hydraulic oil. The resulting liquid is utilized in a hydraulic transmission system, as in Example 3, and is found to provide the same advantages, specifically increased power transmission efficiency and decreased operating temperature.

EXAMPLE 5

Example 3 is repeated except the fluid utilized consists of 0.3% by volume of a 70.0% ethoxylated dehydroabietylamine, 15.0% dehydroabietylamine and 15.0% isopropanol; 1.0% Crofatol P, by volume; 0.2% of a 50% by weight solution of sodium hydroxide in water; and the balance MIL–H5606A. Somewhat better results were obtained than in the case of Example 3.

It is found that the sodium and potassium salts of fatty acids give particularly good results and they are accordingly preferred.

Fatty acids utilized are not critical. The following commercially available acids (listed by trademark) have been found quite satisfactory: Acintol Tall Oil FA–1 which contains 94.2% fatty acids of which 8% are polyunsaturated, conjugated, as linoleic, 36% are polyunsaturated, nonconjugated, as linoleic, 52% as oleic, and 4% are saturated; Acintol Tall Oil FA–2 which contains 97% fatty acids of which 7% are polyunsaturated, conjugated, has linoleic, 39% are polyunsaturated, nonconjugated, as linoleic, 50% is oleic, and 4% are saturated; Neo-fat 9410 which contains 0.5% lauric, 3.5% myristic, 4% palmitic, 1% margaric, 2% stearic, 1.5% myristoleic, 6.5% palmitoleic, 73% oleic, 6.5% linoleic, and 1% linolenic; Neo-fat 9404 which contains 0.5% lauric, 3.5% myristic, 3.0% palmitic, 1% margaric, 1.5% myristoleic, 6.5% palmitoleic, 76% oleic, 6.5% linoleic, and 1% linolenic; Neo-fat 140 which contains 1% myristic, 4% palmitic, 1% palmitoleic, 34% oleic, 59% linoleic, and 1% linolenic, Crofatol No. 1 which contains 2–4% saturated fatty acids, 49–53% oleic acid, and has 44–46% linoleic; and Crofatol O, which contains 55% fatty acids.

In addition to polyisobutylene, various other polymers soluble in the base fluid (the conventional hydraulic fluid) may be used. For example, polybutenes generally, polystyrene, and polyethylene. Considerably better results are obtained when high molecular weight polymers are used, particularly those with molecular weights substantially in excess of 100,000 (e.g., on the order of about 200,000, or more).

In the alkali metal salt embodiment hereof, it is deleterious to the beneficial results of the present invention if water is present in quantity greater than about five times the weight of alkali metal hydroxide used in preparation of the alkali metal salt.

The present invention is not limited to a particular type of pumps and/or motors in transmission systems, for example, both rotating and reciprocating pumps and motors may be used.

Having described the invention in connection with certain specific embodiments thereof, it is to be understood that further modifications may now suggest themselves to those skilled in the art and it is intended to cover such modifications as fall within the scope of the appended claims.

What is claimed is:

1. The method of transmitting mechanical power between a driving member and a driven member comprising:
   (a) moving said driving member against a visco-elastic liquid to produce motion of said liquid;

(b) contacting the moving visco-elastic liquid with said driven member to cause motion of said driven member;

said visco-elastic liquid consisting essentially of a major portion of a hydrocarbon oil, said oil having an initial boiling pont greater than about 180° F., a viscosity of between about 2 and 100 centipoises and a density of about 0.75 to 0.95 gram per cc., and a minor proportion of an additive selected from the group consisting of alkali metal salts of higher fatty acids, said minor proportion being in the range from about 0.1% to about 20.0% of the total weight of said visco-elastic liquid, and said major proportion ranging from about 99.9% to about 80.0% of the total liquid weight.

2. The method of claim 1 in which said additive is an oil insoluble alkali metal salt of a fatty acid.

3. The method of claim 2 in which said alkali metal salt is the sodium salt of a fatty acid.

4. The method of claim 2 in which said insoluble alkali metal salt is the potassium salt of a fatty acid.

5. The method of claim 1 in which said driving member comprises rotating impeller and in which said driven member comprises a hydraulic motor having a rotatable member driven by said moving liquid.

6. The method of claim 1 in which said driving member and said driven member are spaced apart, and further comprising conveying said moving liquid through conduit means from said driving member to said driven member for contact therewith and thence for returning said liquid from said driven member to said driving member.

References Cited

UNITED STATES PATENTS

| | | | |
|---|---|---|---|
| 1,628,647 | 5/1927 | Becker | 252—41 |
| 3,017,361 | 1/1962 | Morris et al. | 252—35 |
| 3,108,076 | 10/1963 | Luechauer et al. | 252—76 |
| 2,375,007 | 5/1945 | Larsen et al. | 252—48 |
| 2,947,699 | 8/1960 | Wasson et al. | 252—76 |
| 3,145,177 | 8/1964 | Orloff et al. | 252—75 |

OTHER REFERENCES

Putilova et al.: Metallic Corrosion Inhibitors, Pergamon Press, New York, 1960, pp. 173–74.

LEON D. ROSDOL, Primary Examiner

D. SILVERSTEIN, Assistant Examiner

U.S. Cl. X.R.

252—73, 74, 79